Nov. 16, 1954  E. A. HALL  2,694,544
PRESSURE ACTUATED VALVE
Filed July 19, 1950
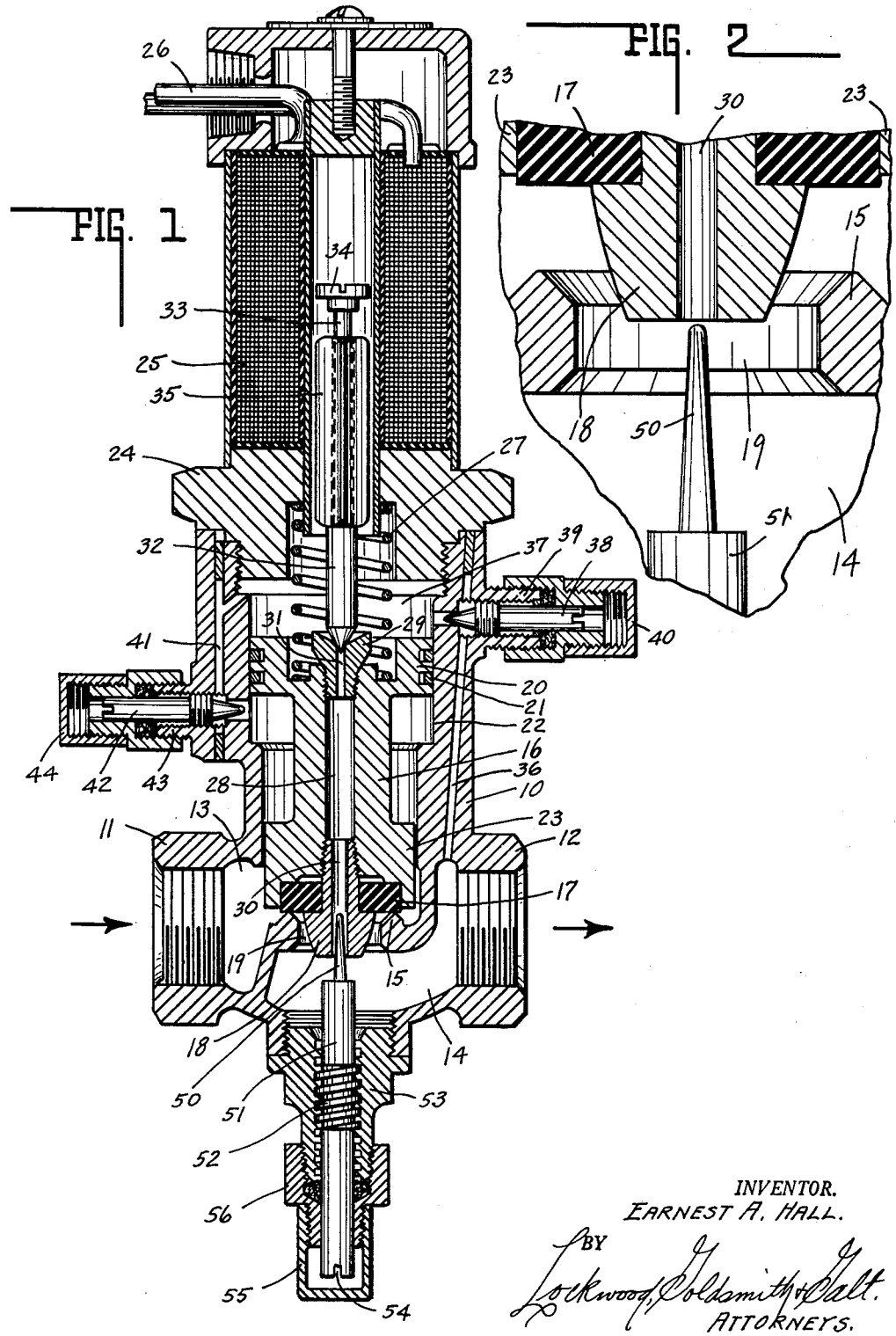
INVENTOR.
EARNEST A. HALL.
BY
Lockwood, Goldsmith & Galt
ATTORNEYS.

United States Patent Office 2,694,544
Patented Nov. 16, 1954

2,694,544

PRESSURE ACTUATED VALVE

Earnest A. Hall, Indianapolis, Ind., assignor to Atkomatic Valve Company, Inc., Indianapolis, Ind., a corporation Application July 19, 1950, Serial No. 174,616

6 Claims. (Cl. 251—35)

This invention relates to a valve controlled by differential fluid pressure for opening and closing a fluid line which may be electrically or otherwise actuated, reference being had to Letters Patent granted to Littlefield June 21, 1927, No. 1,633,217, entitled "Valve."

In valves of this general type the opening and closing action is substantially instantaneous, which is a definite advantage in many uses, but is objectionable in certain applications of the valve. For example, in controlling a hydraulic lift, as in an elevator, a quick full opening of the valve results in an equally sudden drop of the elevator, which is highly objectionable.

It is therefore the purpose of this invention to provide a valve structure of this character which is slow opening and closing with acceleration of its opening from a restricted to a full open position. This is accomplished by providing an adjustable but immovable tapered metering pin in the valve body to extend into the manually controlled pressure relief passage of the piston valve. Said metering pin is adjusted in said passage when the valve is closed to provide a predetermined minimum effective pressure relief area, said relief area being gradually increased and accelerated as the valve piston rises to its maximum open position due to the taper of the pin. Thus, after the valve is manually actuated to open the pressure relief passage through the valve piston, there will be a slow restricted opening of the valve with a gradual but accelerated movement to its full open position.

Another feature of the invention resides in the adjustable by-pass on the pressure side of the valve structure to permit controlled slow closing of the valve such that its closing action will be retarded to thereby provide a cushioning effect, such as to bring an elevator or the like to a gradual stop.

A further feature of the invention resides in the provision of a manually controlled by-pass for pressure relief whereby the valve may be opened in event electrical or other remotely controlled actuating means may fail.

The full nature of the invention will be understood from the accompanying drawings and the following description and claims:

Fig. 1 is a central vertical section through the valve showing it in closed position.

Fig. 2 is an enlarged sectional view of the metering pin with the valve in open position.

In the drawings there is shown a valve structure having a valve body 10 provided with an inlet coupling 11 and an outlet coupling 12. The coupling 11 is adapted to receive a fluid pressure line communicating with a pressure chamber 13, and the coupling 12 is adapted to receive a discharge line communicating with a discharge chamber 14. Said chambers 13 and 14 are separated by a valve seat 15.

Mounted in the valve body to reciprocate therein there is a piston valve including a valve head 16 carrying at its lower end a valve disk 17 adapted to engage the valve seat 15. Extending downwardly through the valve disk and secured to the valve head there is a valve disk screw 18 for clamping the valve disk in place on the head, said disk screw freely extending through and in spaced relation within the valve seat bore 19.

The piston valve carries at its upper end a piston 20 having guide rings 21 slidably engageable within the cylinder wall 22. The intermediate portion of the piston valve is spaced inwardly from the inner wall of the body 10, being provided with a cylindrical enlargement 23 at its lower end having a free sliding fit with some clearance with respect to said body. The valve body carries at its upper end a threaded cylinder cap 24 upon which there is mounted a solenoid 25 provided with suitable electrical connections indicated at 26. Mounted in a suitable seat provided in the cylinder cap 24 there is a compression spring 27 which seats within and bears upon the piston 20. The piston valve is provided with a centrally-disposed bore 28 which is internally threaded at opposite ends. Screwed in the upper end thereof there is a pilot valve seat 29, the valve disk screw 18 being screwed into the lower end thereof. The latter screw is formed with a central bore 30 and the pilot valve seat 29 is formed with a corresponding central bore 31.

Resting by gravity on the pilot valve seat 29 there is a pilot valve 32 having an upwardly extending stem 33 terminating in a head 34. Slidably mounted on said stem there is an armature 35 movable within the core of the solenoid 25.

On one side of the valve body there is formed a by-pass 36 between the pressure chamber 37 above the piston 20 and the discharge chamber 14. Said by-pass is controlled by an adjustable relief screw 38 threaded within a boss 39 and sealed in adjusted position by a cap 40. On the opposite side of the valve body there is provided a by-pass 41 communicating between the pressure chamber 37 and the opposite side of the piston 20. Said by-pass is controlled by an adjustable timing screw 42 threaded in a boss 43 to be sealed in adjusted position by a closure cap 44.

In the operation of the valve to the extent above described, it is maintained in closed position under pressure of the spring 27, the fluid pressure above and below the piston being equalized. To bring about the equalization of the fluid pressure on the piston 20 the fluid pressure from the inlet line entering the pressure chamber 13 by-passes the loose valve enlargement 23 of the valve head and to some extent by-passes the guide rings 21 in the piston to reach the pressure chamber 37 above the piston. To facilitate such pressure equalization, however, the timing screw 42 may be adjusted to permit by-passing of the fluid through the by-pass 41. The line pressure is thus equalized on opposite sides of the piston so that the pressure exerted by the spring 27 will be sufficient to maintain the valve in its closed position on the valve seat 15.

For actuating the valve to open it the solenoid 25 is energized, causing the armature 35 to be jerked upwardly to impact against the head 34 with sufficient of a hammer blow to free the pilot valve 32 from the pilot valve seat 29. The pressure in chamber 37 is thus relieved through the bore 28 to the outlet chamber 14, the differential line pressure then being substantially greater on the underside of the piston than above the piston, overcomes the tension of spring 27, raising the valve head to open the bore 19 and permit direct flow therethrough between the inlet and outlet lines. This condition continues until the solenoid 25 is deenergized, dropping the pilot valve 32 to close the bore 28 so that pressure will then build up above the piston in the chamber 37 and permit the spring 27 to force the valve head to closed position.

The timing screw 42 controls the duration of pressure build-up above the piston in chamber 37 such as to effect closure of the valve following closure of the pilot valve 27. The more restricted the by-pass 41, the slower will be the pressure equalization and therefore a more gradual closing of the valve will result such as to prevent a sudden jarring effect. Thus, to slow down the closing action of the valve the timing screw 42 is adjusted toward its inner position to increase the restriction in the by-pass 41. To speed up the closing of the valve the timing screw 42 is retracted to reduce the restriction in the by-pass.

To operate the valve in event of electrical failure, the relief screw 38 is provided which controls the by-pass 36. Said relief screw functions precisely as the pilot valve 32. Thus, in event of electrical failure whereby pilot valve 32 cannot be opened, relief screw 38 is manually turned from closed to open position to release the valve closing pressure in chamber 37. Obviously the relief screw is normally in its closed position, although it may be adjusted to slightly open position which will reduce the effectiveness of spring 27 by maintaining a predetermined unbalanced pressure on opposite sides of the piston 20.

It is the main purpose of this invention, however, to further control the opening of the valve by an additional adjustment, and particularly to provide for an initially restricted slow opening movement gradually accelerating to its full open rapid position. This is of particular value in overcoming the problem of sudden drop in a hydraulic lift elevator. For this purpose there is provided a tapered metering pin 50 extending into the bore 30 of the valve disk screw 18. Said metering pin extends upwardly from the end of the metering pin stem 51 provided with steep pitch screw threads 52 engaging the internally threaded plug 53. The free end of said stem is provided with a tool engaging recess 54, and is enclosed for sealing protection by a cap 55 screwed upon a stem packing member 56.

With the valve in its closed position, as shown in Fig. 1, the relative position of the metering pin thereto is such that the bore 30 is restricted to a predetermined maximum degree, such as will permit a relatively slow escape of the fluid from the pressure chamber 37 when the pilot valve 32 is opened. The flow will be so restricted as to permit only a gradual change in pressure equalization of the piston 20 to slowly compress spring 27, resulting in only a slight raising of the valve disk 17 from its seat. Thus, the fluid flow through the line will be initiated. But as the valve is unseated and moves upwardly the passage about the metering pin 50 will be increased so as to permit of more rapid change in the differential pressure and therefore a more rapid compression of the spring 27 accelerating the opening of the valve until it reaches its maximum open position with the fluid line unobstructed, as shown in Fig. 2. Thus, as the valve moves towards its open position relative to the tapered metering pin, such movement will be accelerated from a slow start to a rapid completion with a corresponding acceleration of the fluid passage through the line.

By adjusting the relative positions of the metering pin and valve through the medium of the steep pitch screw threads 52, said metering pin may be set and sealed by the cap 55, to a more or less slow opening. With the pin set higher, the opening of the fluid line will be slower. With the pin set lower, the opening of the line will be more rapid. But in any case there will be an acceleration from initial opening to full open position.

The invention claimed is:

1. In a valve structure of the character and for the purpose described, including a valve body connected into a fluid pressure line, a reciprocating pressure actuated piston valve therein spring biased to closing position, said valve having a pressure relief bore therethrough and a normally closed pilot valve at one end thereof operable to open said bore to permit pressure actuation of said valve to open position, the combination therewith of a metering pin on said body extending into the opposite end of said bore, said pin being tapered inwardly of said bore to provide a variable reduction in the restriction by said pin according to the displacement of said piston valve relative thereto for effecting an initially slow accelerated opening thereof.

2. In a valve structure of the character and for the purpose described, including a valve body connected into a fluid pressure line, a reciprocating pressure actuated piston valve therein spring biased to closing position, said valve having a pressure release bore therethrough and a normally closed pilot valve at one end thereof operable to open said bore to permit pressure actuation of said valve to open position, the combination therewith of a metering pin adjustable in said valve body to a fixed position relative to said valve and extending into the opposite end of said bore, said pin being tapered inwardly of said bore to provide a variable reduction in the restriction by said pin according to the displacement of said piston valve relative thereto for effecting an initially slow accelerated opening thereof.

3. In a valve structure of the character and for the purpose described including a valve body connected into a fluid pressure line, a reciprocating pressure actuated piston valve therein spring biased to closing position, said valve having a pressure release bore therethrough and a normally closed pilot valve at one end thereof operable to open said bore to permit pressure actuation of said valve to open position, the combination therewith of a tapered metering pin adjustable in said valve body to a fixed position relative to said valve extending into a cylindrical portion of said bore at the opposite end of said piston valve to provide a variable restriction therein according to the relative displacement therebetween for effecting an initially slow accelerated opening of said valve.

4. In a valve structure of the character and for the purpose described including a valve body connected into a fluid pressure line, a reciprocating pressure actuated piston valve therein spring biased to closing position, said valve having a pressure release bore therethrough and a normally closed pilot valve at one end thereof operable to open said bore to permit pressure actuation of said valve to open position, the combination therewith of a tapering metering pin adjustable in said valve body to a fixed position relative to said valve and extending into a cylindrical portion of said bore at the opposite end thereof to provide a variable restriction according to the displacement of said piston valve relative thereto, said restriction being greater at the initial movement of said piston valve and decreasing progressively with its continued movement to maximum open position.

5. In a valve structure having an inlet side and an outlet side, said inlet side adapted to be connected with a fluid line under pressure, a passage therebetween having a valve seat, a reciprocating piston valve spring biased to seating engagement with said seat, said piston valve having a pressure relief bore therethrough terminating at one end in a pilot valve seat, and a pilot valve operable to selectively open and close said bore, the combination therewith of a metering pin on said body extending into the opposite end of said bore, said pin and bore being relatively tapered to provide a variable reduction in the restriction of said pin according to the displacement of said piston valve relative thereto for effecting an initially slow accelerated opening thereof.

6. In a valve structure having an inlet side and an outlet side, said inlet side adapted to be connected with a fluid line under pressure, a passage therebetween having a valve seat, a reciprocating piston valve spring biased to seating engagement with said seat, said piston valve having a pressure relief bore therethrough terminating at one end in a pilot valve seat, and a pilot valve operable to selectively open and close said bore, the combination therewith of a tapering metering pin adjustable in said valve body to a fixed position relative to said valve and extending into a cylindrical portion of said bore at the opposite end thereof to provide a variable restriction according to the displacement of said piston valve relative thereto, said restriction being greater at the initial movement of said piston valve and decreasing progressively with its continued movement to maximum open position.

References Cited in the file of this patent

UNITED STATES PATENTS

| Number | Name | Date |
|---|---|---|
| 988,495 | Noyes | Apr. 4, 1911 |
| 1,031,294 | Schutte | July 2, 1912 |
| 1,085,070 | Voight | Jan. 20, 1914 |
| 1,359,187 | McLaughlin | Nov. 16, 1920 |
| 1,435,067 | Hurst | Nov. 7, 1922 |
| 1,793,252 | Roth | Feb. 17, 1931 |
| 2,020,833 | Hansen | Nov. 12, 1935 |
| 2,084,030 | Hoppe | June 15, 1937 |
| 2,181,900 | Langdon | Dec. 5, 1939 |